(12) United States Patent
Rovinsky

(10) Patent No.: US 7,915,750 B1
(45) Date of Patent: Mar. 29, 2011

(54) METHODS AND APPARATUS FOR GENERATING ELECTRICAL ENERGY WITH A SUBMERGED TANK

(76) Inventor: William Rovinsky, Plainview, NY (US)

( * ) Notice: Subject to any disclaimer, the term of this patent is extended or adjusted under 35 U.S.C. 154(b) by 0 days.

(21) Appl. No.: 12/802,260

(22) Filed: Jun. 3, 2010

(51) Int. Cl.
*F03B 13/00* (2006.01)
*H02P 9/04* (2006.01)

(52) U.S. Cl. .......................................... 290/54; 290/52

(58) Field of Classification Search .............. 290/42–43, 290/53–54; 60/504, 698; 405/75–76; 416/7, 416/85; 417/330–333
See application file for complete search history.

(56) References Cited

U.S. PATENT DOCUMENTS

| | | | |
|---|---|---|---|
| 4,141,670 A | | 2/1979 | Russell |
| 4,587,435 A | * | 5/1986 | McCullough ................. 290/54 |
| 4,797,563 A | * | 1/1989 | Richardson ................... 290/54 |
| 5,297,925 A | * | 3/1994 | Lee et al. ........................ 415/7 |
| 5,430,333 A | * | 7/1995 | Binford et al. ................ 290/54 |
| 6,114,773 A | * | 9/2000 | Kouris .......................... 290/52 |
| 6,800,954 B1 | * | 10/2004 | Meano .......................... 290/53 |
| 7,329,962 B2 | * | 2/2008 | Alstot et al. .................. 290/54 |
| 2006/0202483 A1 | * | 9/2006 | Gonzalez ..................... 290/53 |
| 2008/0211231 A1 | | 9/2008 | Evans ........................... 290/53 |
| 2009/0155043 A1 | | 6/2009 | Krippene |
| 2009/0173404 A1 | | 7/2009 | Bowers .................... 137/561 R |
| 2009/0230687 A1 | * | 9/2009 | Robichaud ................... 290/54 |

FOREIGN PATENT DOCUMENTS

| | | |
|---|---|---|
| EP | 1531264 | 5/2005 |
| FR | 2813925 | 3/2002 |
| GB | 2456333 | 7/2009 |
| WO | WO 00/31412 | 6/2000 |
| WO | WO 03/050411 | 12/2001 |
| WO | WO 2005/106240 | 11/2005 |

* cited by examiner

*Primary Examiner* — Michael C Zarroli

(57) ABSTRACT

Generation of electrical energy from water is performed by submerging a tank having an inlet and an outlet in a body of water so that the water inlet is located under a water surface and covered by water, and water flows thereby into an interior of the tank, evacuating water from the tank through the outlet to maintain in the interior of the tank a space for flowing water through the inlet into the interior of the tank; and arranging a converting unit which converts energy of the water flowing into the interior of the tank into an electrical energy.

13 Claims, 6 Drawing Sheets

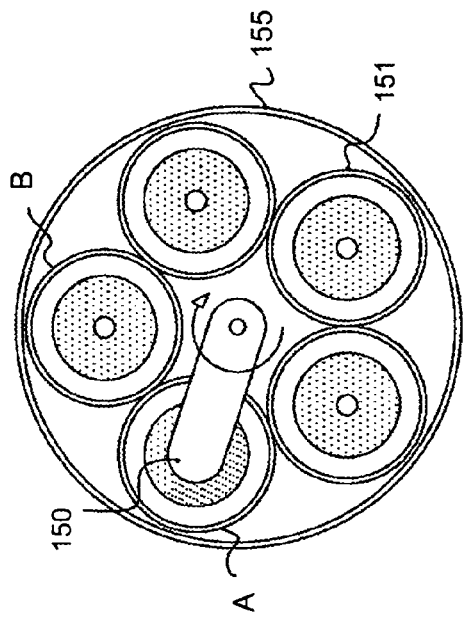
Fig. 8
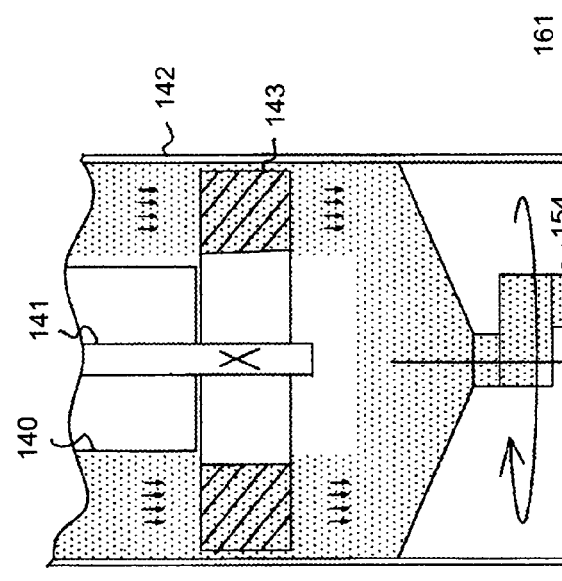
Fig. 9
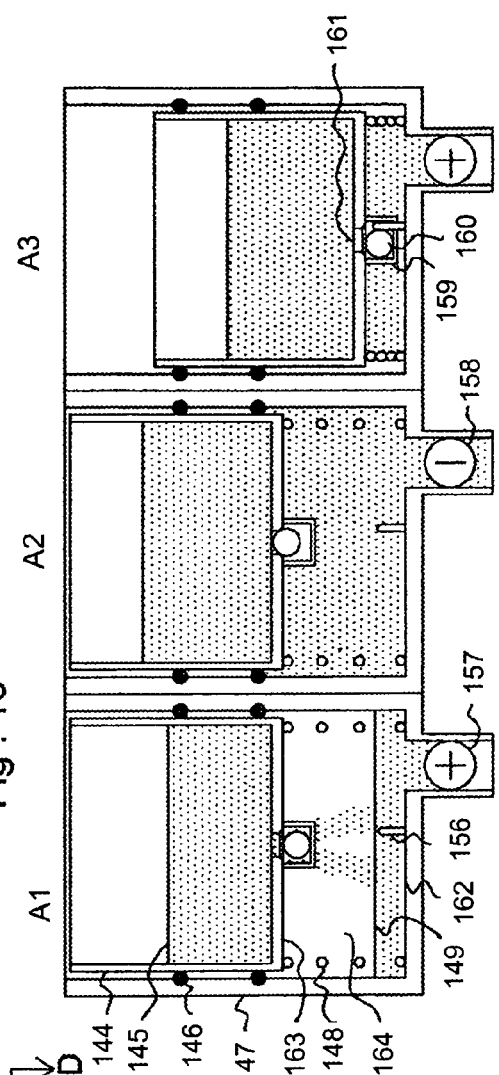
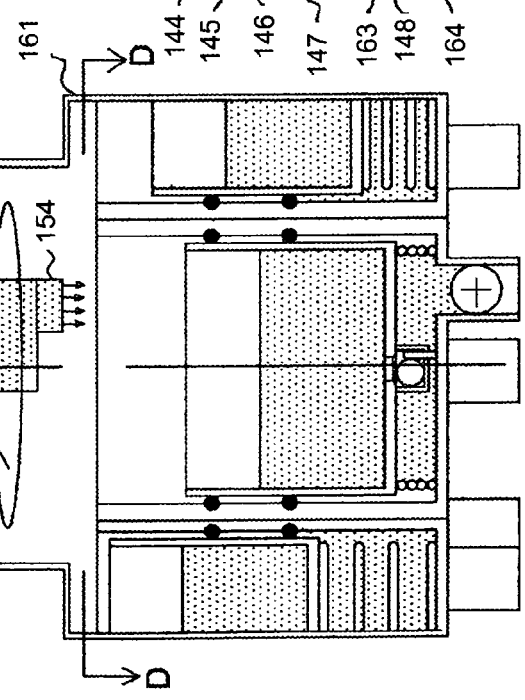
Fig. 10

METHODS AND APPARATUS FOR GENERATING ELECTRICAL ENERGY WITH A SUBMERGED TANK

BACKGROUND OF THE INVENTION

The present invention relates to a method and an apparatus for generating electrical energy with the use of water.

Method and apparatus of this type are known in the art. U.S. patent application publication US 2008/0211231 discloses a device consisting of a container which is partially submerged in the sea in which force of the water flowing through the pipes causes turbines to rotate thus generating electricity which may be transmitted to land.

U.S. patent application publication 2009/0173404 discloses a system for providing a structure or structures for altering water surface temperature having a holding vessel with a wall extending above a water level and a submerged lower portion, with a conduit extending to a water depth.

International patent application publication WO 00/31412 discloses a unit for production of electric power using the energy of the sea water which changes kinetic and potential energy of waves into energy of position, based on differences in height.

International patent application publication WO 2005/106240 discloses a method for energetic technical and biological use of underground water in which water flows from a depth of water at hydrostatic pressure through pipes arranged in a wall built on solid ground, towards hydraulic turbines driving generators and/or other technical installations or devices to be driven. Water from the turbines then flows toward aquaculture structures installed deeper where the water is used to grow aquatic plants and rear aquatic animals or is used for technical purposes.

British patent GB 2,456,333 discloses a tidal pump system in which a water powered pump is actuated by variable water levels e.g. tidal energy. The pump may pump water between different depths within the water, e.g. to adjust nutrient levels or temperature, or it may pump fluids or fluent solids to or from the water e.g. to provide materials, or to store gasses below water.

French patent FR 2,813,925 discloses electricity generation by tidal flow pressure using rising tide to transfer fresh water to a floating reservoir which then supplies a fixed reservoir via a turbine during ebbing tide.

It is believed that the existing methods and apparatus for generating electrical energy can be further improved.

SUMMARY OF THE INVENTION

It is therefore an object of the invention to provide a method and apparatus for generating electrical energy which is a further improvement.

In keeping with these objects and others which will become apparent hereinafter, one feature of the present invention resides, briefly stated, in a method of generating electrical energy from water, comprising the steps providing a tank having an inlet and an outlet; submerging the tank in a body of water so that the water inlet is under a water surface and covered by water and water flows into an interior of the tank; evacuating water from the tank through the outlet so as to maintain in the interior of the tank a space for water to flow through the inlet into the interior of the tank; and arranging converting means which convert energy of the water flowing into the interior of the tank through the inlet into an electrical energy.

Another feature of the present invention resides in an apparatus of generating electrical energy from water, comprising a tank having an inlet and an outlet and submerged the tank in a body of water so that the water inlet is under a water surface and covered by water and water flows into an interior of the tank; means for evacuating water from the tank through the outlet so as to maintain in the interior of the tank a space for flowing the water through the inlet into the interior of the tank; and converting means converting energy of the water flowing into the interior of the tank through the inlet into an electrical energy.

In accordance with a further feature of the present invention the evacuation of water through the outlet of the container is performed either by gravity or by a mechanical evacuation device.

In accordance with another feature of the invention, means is provided inside the tank so as to form an underwater fall.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 8 is a view showing an apparatus for generating electrical energy, equipped with a new system of evacuation of water according to the present invention;

FIG. 9 is a view showing an apparatus for generating electrical energy, with a plurality of pumps activated by gravity according to the present invention, and FIG. 10 is a view showing an apparatus for generating electrical energy, with a self-propelled pump according to the present invention.

DESCRIPTION OF THE PREFERRED EMBODIMENTS

Figure 1:
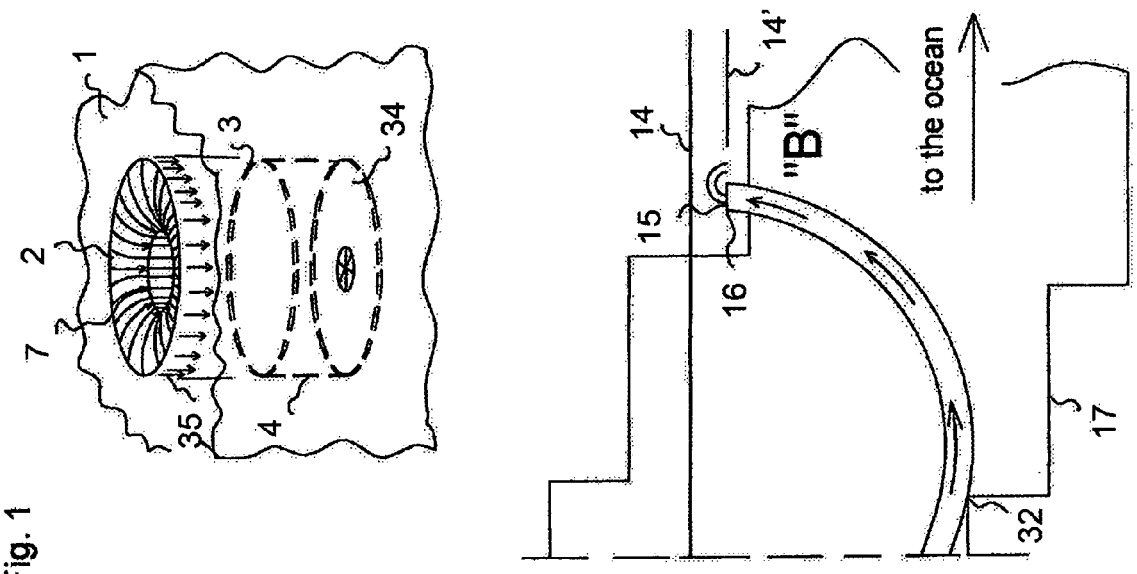
FIG. 1 shows a submerged into the water apparatus for creation of "underwater falls" according to the present invention.

The present invention relates to a method and an apparatus, which convert energy of moving water of ocean, river, lake into highly efficient kinetic energy of the "underwater falls", capable to rotate for example turbine, and thereby to produce electrical energy. Shown in the drawings and described herein below in details are preferred embodiments of the invention. It is to be understood, however, that the present disclosure is an exemplification of the principles of the invention to the illustrated embodiments.

FIG. 1 shows a "Funnel effect". If the top rim 3 of the empty tank 4 is pushed slightly under the water 1, the water 35, that is above the rim, immediately begins to flow inside of tank 4 via its inlet, creating a funnel 2 on the water surface and leaving a central area of the tank 7 free of water. Tubular shaped water is falling free to the bottom 34 of the tank 4 until the tank is full. This short living waterfall produces an energy of the free falling water and opens a possibility to convert it into electrical energy.

Figure 2:
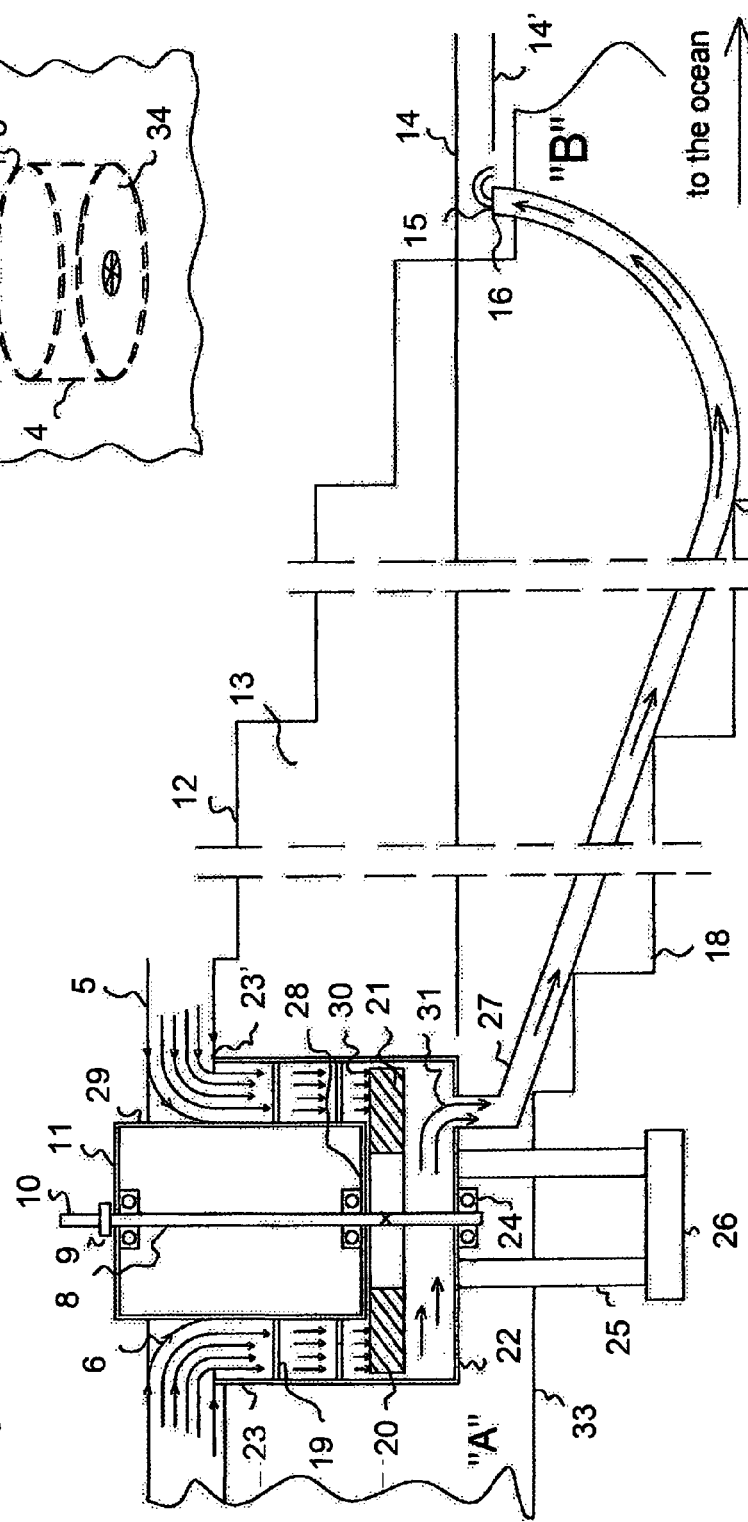
FIG. 2 is a sectional perspective view of an embodiment, which creates continuously working in depth of the river "underwater falls" rotating the turbine, and use gravity for a water evacuation system, according to the present invention.

FIG. 2 shows a schematic view of the central section of an apparatus according to one embodiment of the invention, that can produce a large volume of useful energy from a body of water, e.g. a river. The apparatus is positioned on the river bed and supported by standoffs 25 and base 26 located under the bottom 33 of the river. A tank 23 has an open top which forms an inlet and a top rim 23'. The bottom 22 of the tank 23 has an opening 31 which forms an outlet. Concentrically to the cylindrical (for instance) wall of tank 23 is placed a sealed barrel 11, with cylindrical wall 29 and bottom 28, taking the place of space 7 shown in FIG. 1. The barrel 11, supported by plurality of horizontal tubings 19, is attached to the inner side of wall 23 of the tank, creating a solid frame of the apparatus with an empty tubular space between walls 23 and 29.

The barrel is elevated above the top rim 23' of the tank. When top rim of the tank 23' with the inlet is pushed inside of water 13 below its top surface 5, the water 6, located above the tank, begins to flow rapidly inside of the empty tubular space, creating a waterfall. Right under the barrel 11 is placed the turbine 20 and the central output shaft 8, to which the turbine is attached, and which is supported by bearings 24. The free falling water of the waterfall 6 and 30 is reaching first, on its way downward, the blades 21 of turbine 20, forcing the turbine to spin. The turbine, being attached to the central output shaft 8, forces the shaft to rotate and through the coupling 9, rotates the shaft 10 of the electrical generator, thus producing electricity. After contacts with the blades of the turbine, water continue to fall downward to the floor 22 of tank; here it is ready for evacuation. There are mechanical ways to evacuate water, collected on the bottom of the tank as will be shown below. FIG. 2 shows the simplest natural way of water evacuation by gravity, which is possible for river power stations: each river has an elevation over the ocean surface and this is the reason why river water is moving toward the ocean. For instance, a Potomac river flows along Atlantic coast of the USA, the river length is 383 miles and the elevation is 3060 ft.

In FIG. 2, line 12 represents a top surface of a river and while lines 17, 18 and point 32 represent the bottom of the river. The level of the bottom 22 of the tank 23, where the water that just passed turbine 20 is collected, is indicated by line 14. Water collected on the bottom 22 of tank 23 runs through the opening 31 into the pipe 27 down to the river floor 32 by gravity. Free end 16 of pipe 27 is positioned at point 15 which is above the top of the water surface 12 at a point which is lower than line 14, i.e. lower than the bottom 22 of tank 23 and the outlet of the tank 31 where evacuation of water begins. Therefore, water in the pipe 27 will flow out into the open air at point 15, following Stevin's Law* for communicating vessels, sometimes referred to as the "Law of communicating vessels", and back to the river. This situation makes it possible for turbine 20 to work continuously. The output power of the turbine strictly depends on it size, configuration and how deep in the water it is located, in other words, how far downward the water in the tubular space of the apparatus is falling before it reaches the blades of the turbine.

*See attachments from wikipedia.com and blurbwire.com

For this apparatus, non-metallic materials are used mostly, like reinforced fiberglass, plastic etc. Before installation is completed, the whole system should be free of surrounding water: turbine will begin to rotate only, if waterfall will run into the empty tubular space of the tank and evacuation of water is ready. Further will be shown an ON/OFF mechanism of the apparatus. The pipe 27 can be located as a straight angled line from the housing 22 to the point 16 in the air.

Figure 3:
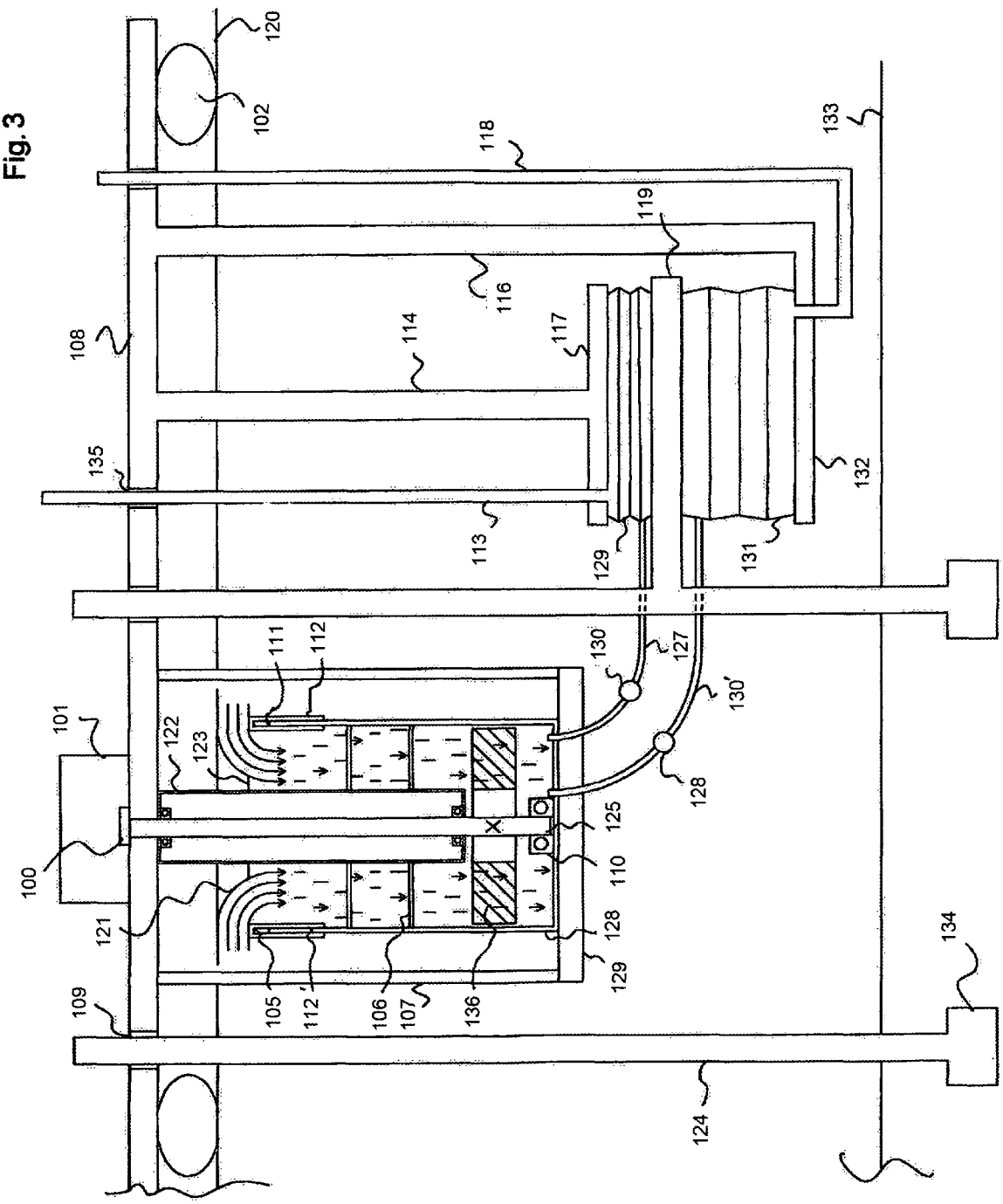
FIG. 3 is a partial perspective view of an embodiment of apparatus, which creates continuously working "underwater falls" in depths of the ocean, rotating turbine and using energy of the low and high tides for water evacuation system, according to the present invention.

FIG. 3 shows another apparatus for creation of "underwater falls", that is designed to work in the depth of an ocean or a sea, and uses energy of low and high tides to operate the water evacuating system. It comprises a few elements with the same functions, as in FIG. 2: cylindrical tank 128 with an open top forming the inlet, empty sealed cylindrical barrel 122'; tubings 106 attaching concentrically inner side of the wall of the tank and outer side of the wall of the barrel, creating a solid frame of apparatus and an empty tubular space between walls. Turbine 136 with a shaft 125, to which turbine is attached and bearings 110 to keep apparatus intact.

The apparatus has a floating platform 108 with supporting balloons (for instance) 102, keeping platform constantly over the water level 120. On the bottom of the ocean a few cylindrical standoffs 124 are installed, that are protruding a floating platform 108 through the holes 109, slightly larger in diameter, than diameter of standoffs 124, allowing platform 108 to move only vertically during low and high tides, and, therefore, keeping a distance between the platform 108 and the top surface of the water 120 constant. A tank is placed on a small platform 129, which is attached to the floating platform 108 by plurality of tubings 107, and therefore, is moving up and down together with a platform 108. In the present position water 121 from above the tank rapidly flows into an empty tubular space of apparatus, creating a waterfall, and, when it reaches blades of the turbine 136, causing turbine to rotate. Turbine, further, rotates the central shaft 125, to which it is attached and the central shaft, in turn, rotates thru coupling 100 the shaft of electrical generator 101, which produces electricity.

After turbine 136, water continues to fall downward to the floor of the tank and here it is ready for evacuation from the tank. Evacuation system is operated by forces of low and high tides of the ocean or the sea: from the tank, water, collected on its bottom, via flexible tubings 127 and 130', flows through the tank outlet by gravity into plurality of pairs, upper 129 and lower 131, of water receptacles (containers), which are located lower than the tank. The receptacles are the collapsible tanks (or are the cylinders with the plungers) Each flexible tubing has a check valve, upper 130 and lower 126, to prevent water from running back into the tank. Upper receptacle 129 is attached from the bottom to the stationary platform 119, which is a part of standoff 124, and from the top, to the moving platform 117, which is attached to the floating platform 108 by the tube 114. The lower receptacle 131 is attached from the top to the stationary platform 119 and from the bottom to the moving platform 132, which is attached to the floating platform 108 by the tube 116.

During low tide, platform 108 goes down and presses receptacle 129 toward stationary platform 117, creating pressure inside of the receptacle 129, which closes the check valve 130 and pushes water, collected inside of the receptacle, outside by evacuating tubing 113, the top end of which is placed above the water surface. At this time platform 132, being attached to downwardly moving platform 108, stretches receptacle 131 and opens the check valve 128, allowing water from the bottom of the tank to flow inside of receptacle 131 by gravity. All water evacuating tubings extend through the top of platform 108 via the holes 135. At the end of the low ocean tide the receptacles take turns and now, rising platform 108 pulls the platform 117 up, opening a check valve 130 and allowing water from the tank to flow down into the receptacle 129 by gravity. At the same time, the rising platform 108 and the tubing 116 are compressing receptacle 131, closing the check valve 126 and pressing water out from receptacle 131 to the open air via evacuating tubing 118 or back to water.

Apparatus has an ON/OFF device 112, which, when needed, stops water from falling inside of tank. This device is a cylinder 112 with double walls 112 and 112', which are connected from the top by solid ring 105, enclosing these walls from the top. Diameter of said double wall "locking" cylinder is, approximately, equal to the diameter of the stationary wall of the tank 128, which allow cylinder 112 to slide up and down on it. In the working position of apparatus this locking cylinder is in its lower position, when the top ring 105 of this cylinder is sitting right on the top rim 111 of the tank, and water from above the locking cylinder is running freely into the tank. When said cylinder is in the top position, the top ring of it 105 is above the water surface and prevents surrounding water to get into the tank, and stops the operation of the apparatus.

Figure 4:
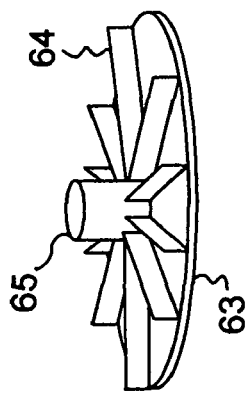
FIG. 4 shows a perspective view of the centrifuge, used in mechanical water evacuating system of apparatus according to the invention.
Figure 5:
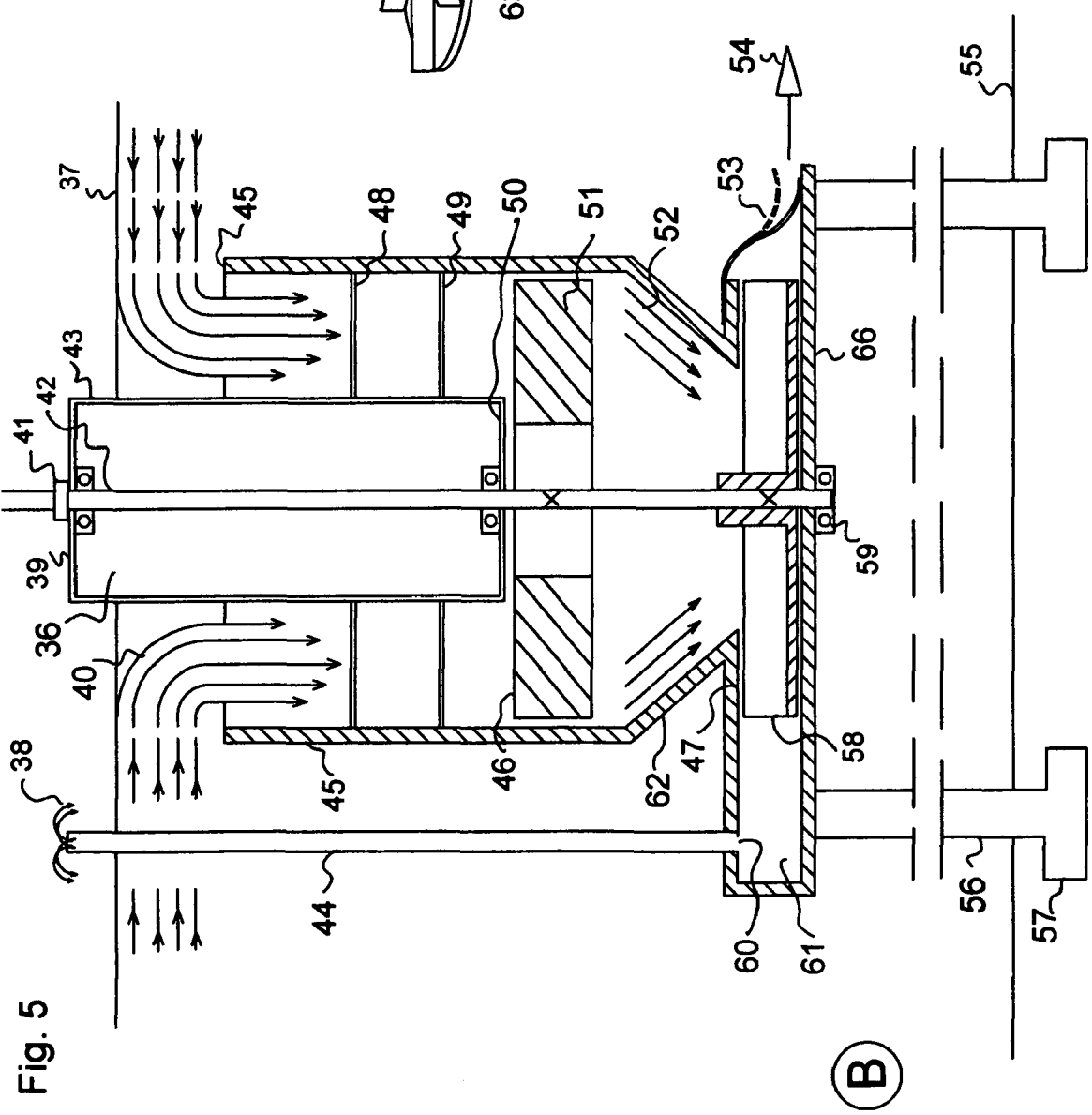
FIG. 5 is an apparatus corresponding to the apparatus for FIG. 1, but with mechanical (centrifuge) water evacuation system, working inside of any large body of water for generating electrical energy according to the present invention.

FIG. 4 shows a perspective view of centrifuge, with its flat horizontal base 63, a plurality of vertical ribs 64 and the central hub 65, used in FIG. 5. FIG. 5 shows an apparatus for creation of "underwater falls" for converting energy of slow moving water of ocean, river, lake into the highly efficient kinetic energy of free falling water, capable to rotate the turbine and to produce electricity. The apparatus is based on standoffs 56 and base 57 in the bottom of the ocean. The difference between this apparatus and the one shown in FIG. 2, is in the method of evacuation water, collected on the bottom of the tank of the apparatus. Here again, the apparatus has a cylindrical tank 45 with an open top forming an inlet and the top rim 45', the barrel 39 with cylindrical wall 43 and the bottom 50. The barrel is attached to the inner side of the wall 45 by plurality of tubings 48 and 49, making the frame of apparatus strong and reliable. The main purpose of the barrel is to create a tubular space between walls 43 and 45 and to fill up the space 36 in the center of tank, leaving it free of water. This will allow to make the tank tall as needed, in order to increase its elevation above water level, it can be used as a platform for electrical generator and all the necessary parts, that go with it. On the central output shaft 42, right under the barrel 39, is placed turbine 46 with its blades 51. Turbine is attached to the central shaft 42, which is supported by bearings 59.

When apparatus is submerged into the ocean or river so that its inlet is under water, water from above the tank flows rapidly into the empty tubular space of apparatus, creating a waterfall, which is running downward to the blades 51 of turbine 46, forcing the turbine to spin. Being attached to the same central shaft, the turbine rotates and through the coupling 41, rotates shaft of the generator, producing electricity. A few mechanical methods of water evacuation from the tank are described below. To the same central shaft 42 with turbine 46 is attached a centrifuge 58. The lower portion of the tank 45, below the turbine, is conical 62 for better control of the water movement. All water, that just passed the turbine blades, is directed to the center of the rotating centrifuge 58, where it is caught between ribs 64 and hub 65 extending above ribs hub 65 (FIG. 4). This allows water between ribs to move out from the center of hub 65 in the point, where centrifugal forces are already sufficient. Portion of the wall 47 of tank helps to lock water between ribs. Substantial centrifugal force pushes the water out from the bottom of tank 66 to the chamber 61, creating pressure, sufficient enough to push water through the opening 60 of the chamber 61 into the tube 44, which is elevated above the water surface 37, and has a normal atmospheric pressure inside. Water evacuates in point 38 and goes back into the ocean or river.

Another possible solution of water evacuation from the tank of the apparatus shown is from side "A". In some cases, depending on the pressure inside the water, it is feasible to seal the bottom of the tank with the elastic circular check valve 53, which opens under the pressure of centrifugal forces, and all the water, collected on the bottom of tank, flows out through the opening 54 back to the ocean (river). Check valve 53 will not allow water to go back inside of tank.

Figure 6:
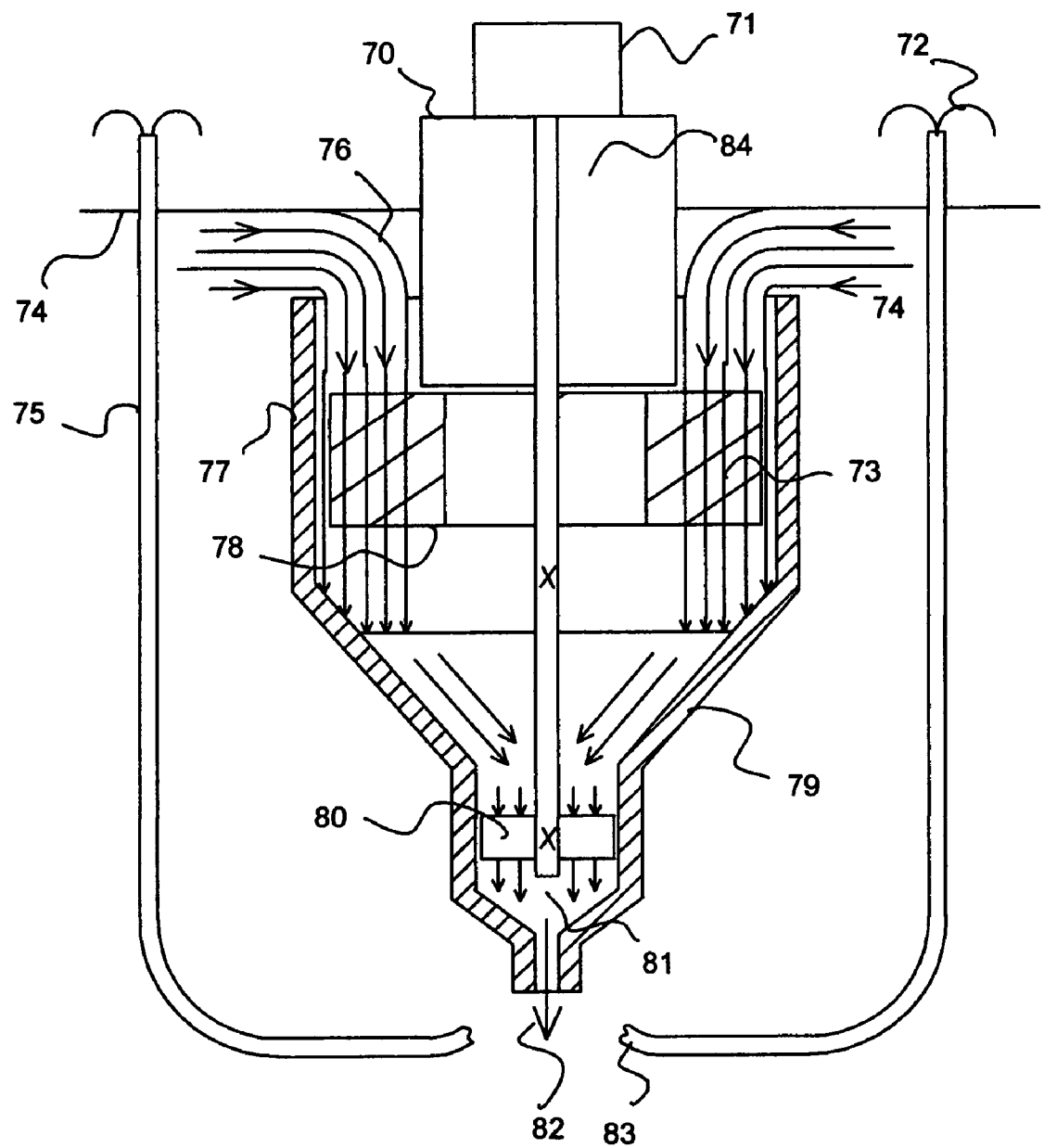
FIG. 6 shows some other mechanisms (marine propeller) to evacuate water from the tank of the apparatus for generating electrical energy according to the present invention.

FIG. 6 shows another method for evacuation of water from the bottom of a tank. Same functional parts are similar to those in FIG. 5: turbine 78 with blades 73 and central shaft 84, barrel 70, flowing water 76 from above the tank 77, electrical generator 71 driven by central shaft 84, top water surface 74 and evacuating tubings, with low atmospheric pressure inside. At the lower part of apparatus a new mechanism is provided for evacuating water from the bottom of tank. Conical portion 79 of body of tank 77 is made to direct water, that just passed turbine blades 73 into a chamber 81, where a propeller 80 is installed and attached to the same central shaft 84 as turbine 78. Propeller is similar to propeller of the ship—simple and very efficient, enough to create high pressure in front of itself. Being driven by the force of the turbine, the propeller will push water from chamber 81 back to surrounding water 82 or to the open air 72 via plurality of evacuating tubing's 83 and 75.

If it is needed to increase revolutions of propeller, centrifuge etc. the gear box can be added inside of tank. All mechanical additions to apparatus however are driven by central shaft and are take some energy from the turbine, but this is only a small portion of the full amount of energy, produced by the turbine. These and other apparatuses the with mechanical type of evacuation of water from the tank to open air can be a model for a "Personal power station" for domestic use.

Figure 7:
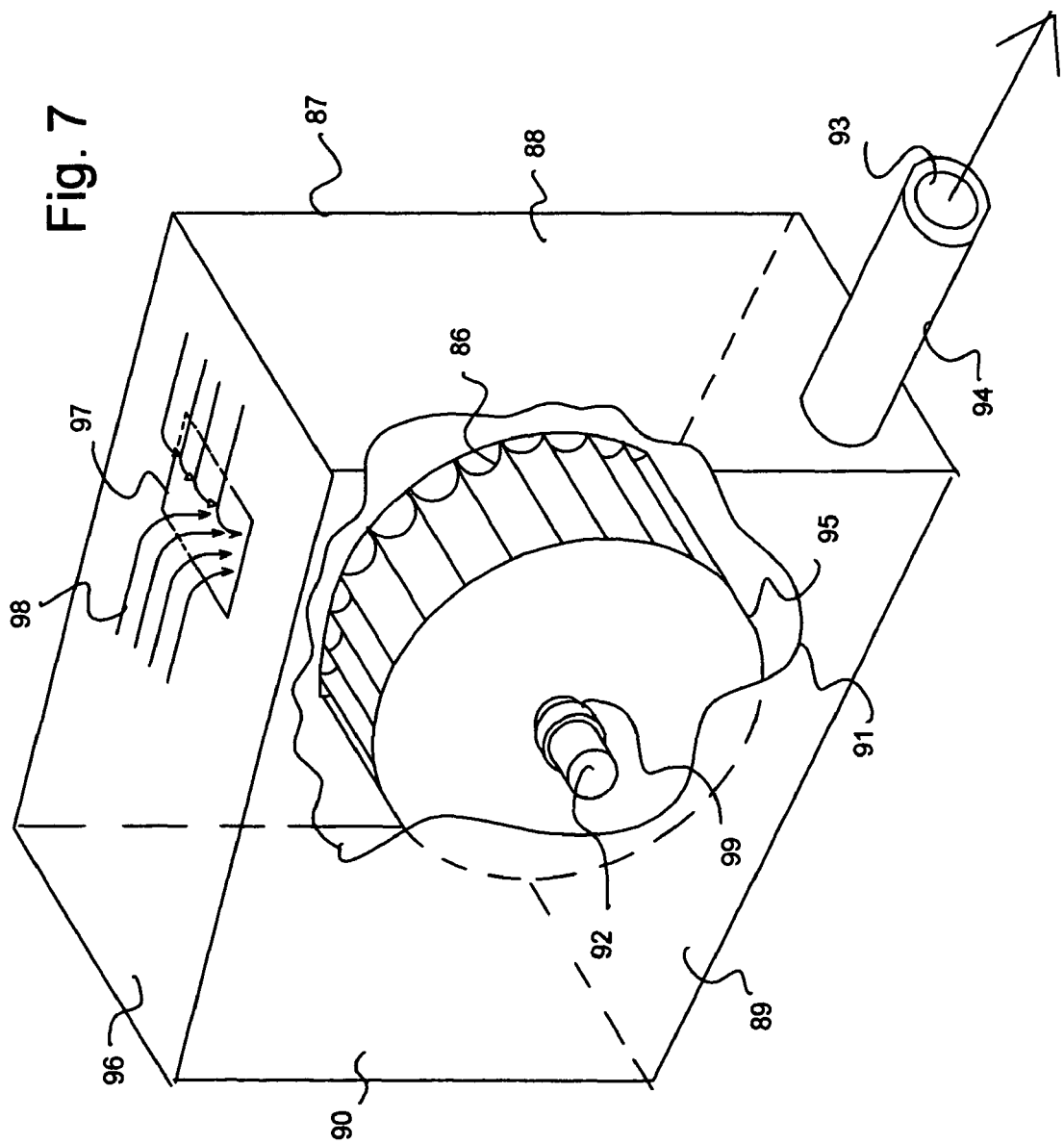
FIG. 7 is an apparatus with a vertical water turbine for generating electrical energy according to the present invention.

FIG. 7 shows an apparatus that converts energy of slow moving water into highly efficient kinetic energy of free falling water, capable to rotate turbine and produce electricity, that uses a vertical turbine. The turbine 95 is attached to the shaft 92 inside of rectangular tank 87 with two pairs of flat walls 88 and 90, with the bottom 89 and the top side 96. The turbine is supported by bearings 99 and the front and back walls 89. The turbine has a plurality of blades 86. In the top plate of tank 96 there is a rectangular opening 97 forming an inlet, size and location of it is designed to supply a maximum of free falling water 98 from the opening 97 to one side of the turbine blades 86, to force the turbine to spin. Turbine will rotate a central shaft 92, which will then rotate the shaft of the electrical generator to produce electricity. The water, collected on the bottom of tank will be evacuated through an opening 93 of tubing 94. Water evacuating system, gravitational, mechanical or even by pumps, that will be used, depends on the location of the apparatus in the water.

FIG. 8 shows a partial section of an apparatus, equipped with a new system of evacuation of water from the tank by gravity, practically, without use of capacity of the turbine. There are two parts of the apparatus: the top part has a waterfall producing tank 142 with the turbine 143 that rotates the shaft 141, and the barrel 140 that is creating tubular falls (in this case for horizontal turbine) to activate turbine blades. In addition, a rotating tubular sleeve 154 is attached to the bottom of the tank. Diameter of this sleeve guaranties, that all water, entered the tank will be evacuated though this rotating sleeve, without being collected inside of the tank. In the lower part 161 of the apparatus is shown front section of the water evacuating system, that consists a plurality of stationary pumps, activated by the weight of the water, supplied in sequence from the rotating sleeve. The top view of pumps and the working technology that makes all pumps successfully evacuate water from the tank 161 are shown in details and described in FIG. 8, section D-D, and FIG. 9.

FIG. 9 shows a top view of a plurality of stationary pumps 151, five pumps in this illustrated embodiment, which are activated by gravity. Pumps are arranged in a circle in the lower portion of tank 155. Also shown is a rotating lever/tubular-sleeve 150, which is driven by the central shaft of the apparatus. The sleeve rotates at a constant speed above said pumps. The sleeve accepts all of the water from the bottom of the tank and, while rotating, passes the water into the plunger of each pump in sequence. For one 360° revolution this sleeve supplies an equal amount of water, approximately half of the volume of each pump, e.g. just enough to fill up the lower portion of the pump, located under the plunger. Two adjacent pumps A and B are chosen to show their operation.

FIG. 10 shows in details three working steps of each self propelled pump, making possible to evacuate the water from the bottom of the tank, disposed by rotating sleeve into the plungers of said pumps. Construction of pumps are identical. Shown here, are three positions A1, A2 and A3 of the same working pump A within three full revolutions of the sleeve, that rotates above pumps with a permanent speed and, while moving, discharges an equal amount of water into each pump sequentially. Each pump consists of a housing 147, a plunger 144, O-rings 146 to separate hermetically the plunger from the housing, a compression spring 148 that in the open position supports an empty plunger, and it is fully compressed when plunger is filled with water. At the bottom 163 of the plunger 144 is placed a normally open check valve, a floating ball 160, that is kept in a short proximity with the opening 161 in the plunger's bottom 163 by pins 159. The normally closed check valve 157 is installed on the bottom 162 of the chamber 164. A pin 156 is fixed to the bottom of the housing. When plunger is filled with water, it is moving down, being activated by weight of the water, and at the end of its travel the pin 156 gets in contact with the ball 160.

The working steps are:

Step 1 is represented by A1: rotating sleeve moves above the pumps and, during its movement above the plunger of the pump A, discharges into it enough water to fill-up the lower chamber 164 at the bottom of the housing. Because the check valve at the bottom of the plunger is open at this time (the ball is in the "down" position by gravity) the water from the plunger flows freely into the chamber 164 of the housing 147. When calculated amount of the water is supplied, the sleeve moves to the next pump B (from FIG. 9) etc., filling-up in one 360° revolution the lower chambers of all pumps. Because the check valves 157 on the bottom of the housings are closed, supplied water remains inside of the chambers. Rising water inside of each chamber lifts a floating ball 160, closing an opening 161 on the bottom of the plunger, trapping the water inside of the chamber. After a full revolution, the sleeve comes back to pump A. Here, the lower chamber of the pump is full with water. Plunger is empty.

Step 2 is represented by A2: Sleeve is moving again above the plunger of the pump A and supplies an equal amount of water into it. Because at this time both valves, on the top and the bottom of the sealed chamber 164 are closed, sleeve is filling-up the plunger. Weight of the rising water in the plunger is pushing the plunger down, compressing the spring and, therefore, the water in the lower sealed chamber 164 of the pump, creating a pressure inside of said chamber. When calculated amount of water is released into the plunger, sleeve move further to pump B (see FIG. 9).

Step 3 is represented by A3: Pressure in the chamber 164 securely closes an opening 161 in the bottom of the plunger and opens the normally closed check valve 158 at the bottom of chamber 164. Full of water plunger is moving more and more down, evacuating water from the chamber. When floating ball 160 is reaching a pin 156, it changes its own position: the pin is slightly moving the ball and, therefore, opens the hole 161. Now, when plunger and chamber are communicating, the pressure in both of them equalizes. Decompressed pump is releasing the compressed spring, which lifts the plunger to its original position, check ball 160 falls down, and the moving up plunger is releasing collected in it water into the chamber: water flows downward by gravity. Once again, chamber is full with water and plunger is empty awaiting for the sleeve to come back above it and supply the same portion of the water.

The described process of water evacuation constantly repeats itself and, therefore, constantly evacuates water from the bottom of the tank, allowing turbine to rotate. In reality, the number of pumps and sleeves in one apparatus can be much larger, in order to speed up the process of water evacuation from the bottom of the tank.

It will be understood that each of the elements described above, or two or more together, may also find a useful application in other types of methods and constructions differing from the type described above.

While the invention has been illustrated and described as embodied in a method and an apparatus for generating electrical energy, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method of generating electrical energy in a tidal body of water comprising the steps of:
   providing a tank comprising an inlet, an interior portion comprising at least one interior wall, and an outlet;
   providing a device for converting energy of water flowing into the interior of the tank into electrical energy;
   submerging the tank in said body of water so that the water inlet is located below the water surface and water flows through said inlet into the interior of the tank;
   utilizing the flow of water to drive said device; and
   evacuating water from the tank;
wherein said step of evacuating water comprises providing a receptacle, said receptacle in fluidic communication with said tank to receive water from said tank, said receptacle comprising relatively movable portions which move relative to each other under the action of tidal changes to the water level of the body of water to expel water from the receptacle.

2. A method according to claim 1 wherein said converting device comprises a rotary element connected to a shaft of a generator of electrical energy, said rotary element having an axis of rotation selected from the group consisting of a vertical axis and a horizontal axis.

3. A method according to claim 1 wherein said step of providing a tank comprises providing an insert disposed in said interior portion and spaced from said interior wall.

4. A method of generating electrical energy in a body of water comprising the steps of:
   providing a tank comprising an inlet, an interior portion comprising at least one interior wall, and an outlet;
   providing a device for converting energy of water flowing into the interior of the tank into electrical energy;
   submerging the tank in said body of water so that the water inlet is located below the water surface and water flows through said inlet into the interior of the tank;
   utilizing the flow of water to drive said device; and
   evacuating water from the tank;
   wherein said step of evacuating water comprises providing a plurality of pumps and evacuating water using said plurality of pumps which evacuate water one after the other,
   wherein said method further comprising the step of providing a distributing element which sequentially distributes water to the pumps.

5. A method according to claim 4 wherein said converting device comprises a rotary element connected to a shaft of a generator of electrical energy, said rotary element having an axis of rotation selected from the group consisting of a vertical axis and a horizontal axis.

6. A method according to claim 4 wherein said converting device comprises a rotary element connected to a shaft of a generator of electrical energy, said rotary element having an axis of rotation selected from the group consisting of a vertical axis and a horizontal axis.

7. A method according to claim 4 wherein said step of providing a tank comprises providing an insert disposed in said interior portion and spaced from said interior wall.

8. An apparatus for generating electrical energy in a tidal body of water comprising:
   a tank which is at least partially submersible comprising an inlet, an interior portion comprising at least one interior wall, and an outlet;
   a device for converting energy of water flowing into the interior of the tank into electrical energy; and
   a receptacle in fluidic communication with said tank to receive water from said tank, said receptacle comprising relatively movable portions which move relative to each other under the action of tidal changes to the water level of the body of water to expel water from the receptacle, and
   further comprising an insert disposed in said interior portion and spaced from said interior wall.

9. An apparatus according to claim 8, wherein said converting device comprises a rotating element connected to a shaft of a generator of electrical energy, said rotating element having an axis of rotation selected from the group consisting of a vertical axis and a horizontal axis.

10. An apparatus for generating electrical energy in body of water comprising:
    a tank which is at least partially submersible comprising an inlet, an interior portion comprising at least one interior wall, and an outlet;
    a device for converting energy of water flowing into the interior of the tank into electrical energy;
    a plurality of pumps in fluidic communication with said tank which evacuate water from said tank one after the other, and
    further comprising a distributing element which sequentially distributes water to the pumps, and
    further comprising an insert disposed in said interior portion and spaced from said interior wall.

11. An apparatus according to claim 10, wherein said converting device comprises a rotating element connected to a shaft of a generator of electrical energy, said rotating element having an axis of rotation selected from the group consisting of a vertical axis and a horizontal axis.

12. An apparatus according to claim 10, wherein said converting device comprises a rotating element connected to a shaft of a generator of electrical energy, said rotating element having an axis of rotation selected from the group consisting of a vertical axis and a horizontal axis.

13. An apparatus according to claim 10 wherein said pumps are gravitational pumps.

* * * * *